(No Model.)
C. G. SCHMIDT & C. SPENGEL.
REFRIGERATOR.
No. 391,864. Patented Oct. 30, 1888.
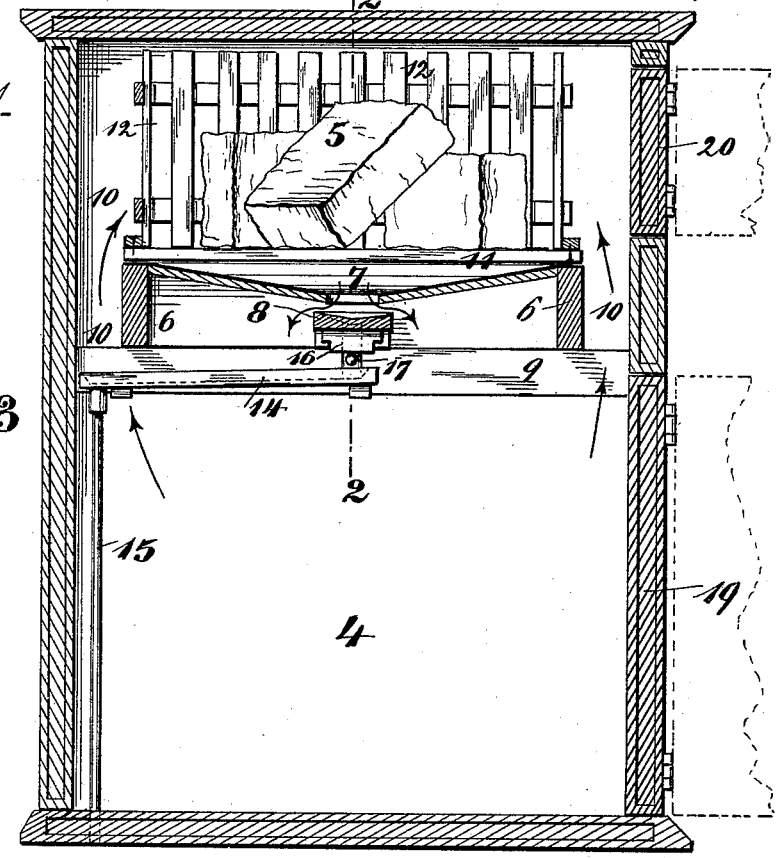
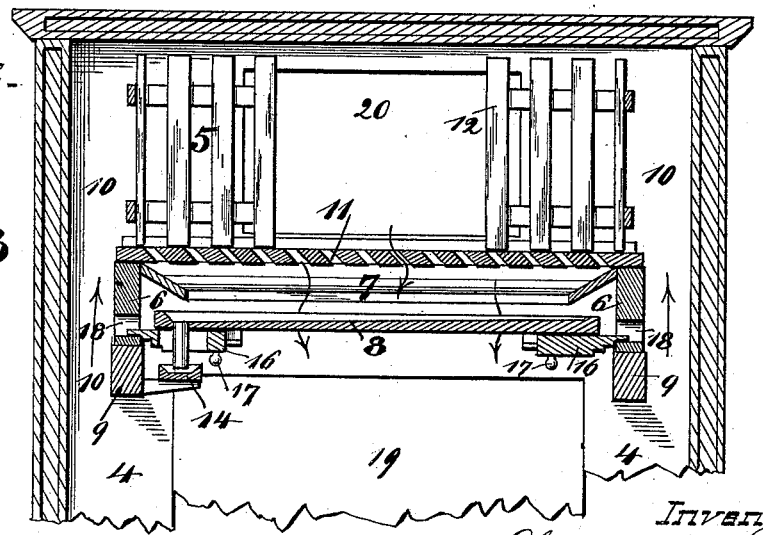
Attest,
Francis M. Riddle.
E. Cordesman.
Inventors.
Charles G. Schmidt
Carl Spengel,
By Carl Spengel their Atty.

and is somewhat below them, so as to form air-passages between them.

UNITED STATES PATENT OFFICE.

CHARLES G. SCHMIDT AND CARL SPENGEL, OF CINCINNATI, OHIO.

REFRIGERATOR.

SPECIFICATION forming part of Letters Patent No. 391,864, dated October 30, 1888.

Application filed April 24, 1888. Serial No. 271,714. (No model.)

*To all whom it may concern:*

Be it known that we, CHARLES G. SCHMIDT and CARL SPENGEL, both citizens of the United States, and residing at Cincinnati, Hamilton county, State of Ohio, have invented certain new and useful Improvements in Refrigerators, of which the following is a specification.

Our invention relates to such refrigerators which have generally two compartments, one for ice and one for provisions, the latter being below the former, and air-passages between the two.

The objects of our invention are to provide means to regulate the cold-air supply, and at the same time make all parts easily accessible for the purpose of cleaning. We attain these objects by the construction illustrated in the accompanying drawings, in which—

Figure 1 shows one of our refrigerators in section. Fig. 2 is a section on line 2 2 of Fig. 1.

3 is the refrigerator; 4 the provision and 5 the ice chamber.

6 is a rectangular frame, which supports a pan, 7, preferably of zinc or of wood and zinc-lined. The four sides of this pan slope toward its detachable and adjustable bottom or drip-trough 8, which is loose from the sides and somewhat below them, so as to form air-passages between them.

Frame 6 rests on suitable supports, brackets, or cross-beams, 9, as shown, and is somewhat smaller in its dimensions than the inside of the refrigerator, so as to leave a space, 10, between it and the former for the passage of air.

11 is a grate on which the ice rests, and 12 are the walls of the ice-chamber, also smaller than the refrigerator, so as to form a continuation of the air-passages 10. Said walls consist, preferably, of open lattice-work, so as to facilitate the free circulation of air around the ice. This ice-chamber may rest loosely on grate 11 or be secured to it or to the inside of the refrigerator. The adjustable bottom or drip-trough 8 serves in the same time as a means to carry the water from the melting ice and collecting in pan 7 to a gutter, 14, and thence through a waste-pipe, 15, to the outside. This pan-bottom has on its under side, on each end, slides 16, which have handles 17 and are stepped off on their outer ends, as shown in Fig. 2. They rest in openings 18 in frame 6, and thereby support the pan-bottom. By pulling these slides inwardly till they clear frame 6 they cease to be supports to the pan-bottom, and the latter may be removed to be cleaned or in order to gain access to the pan from below for the same purpose. The cold air sinks to the bottom of the pan, passes through the open space between it and its bottom, and down into the provision-chamber, where it displaces the warmer air, which rises at the sides through spaces 10, as indicated by arrows. It passes over the ice, is also cooled, and passes down, thereby producing a continual circulation inside the refrigerator.

By raising or lowering the adjustable bottom of the pan the cold-air supply may be regulated or entirely shut off. The raising of the bottom 8 is accomplished as follows: It is lifted up and slides 16 pushed farther into the openings 18, so that one of the lower steps comes to rest in said openings. Pulling the slides 16 inwardly, bottom 8 is lowered.

In very large refrigerators we place several of our pans side by side, so as to have more cold-air passages. In this latter case gutter 14 is so much longer as to connect with all the bottoms 8, and one ice-chamber is only used. In order to prevent the water from the melting ice to rush or drop from it directly into the pan-bottom, which might cause it to splash or spatter, the sides of the grate-bars are so inclined that one grate-bar partly overlaps the other, whereby the water is prevented from dropping directly through the spaces, but hits the bars first and then runs slowly down into the pan.

19 is the door of the provision-chamber, and 20 the door through which the ice-chamber receives its supply. The wall of the ice-chamber is correspondingly left open opposite door 20.

We are well aware that there are several patents on refrigerators in existence embodying our general principles, and therefore do not claim, broadly and generally, the construction of a refrigerator as described; but

What we claim, and want to secure by Letters Patent, is the specific construction and arrangement, as follows:

In a refrigerator having a cold-air chamber and an ice-chamber, the combination, with the frame, as 6, provided with apertures, of the pan 7, having an opening in its inclined bottom, the drip-trough arranged beneath the said opening, and the stepped slides on opposite under sides of the said drip-trough, whereby it may be adjusted vertically with relation to the said pan, substantially as specified.

In testimony of which invention we hereunto set our hands.

CHARLES G. SCHMIDT.
CARL SPENGEL.

Witnesses:
FRANCIS M. BIDDLE,
FRANK O. LOVELAND.